Oct. 27, 1970   H. J. THOMPSON, JR   3,536,555
APPARATUS AND METHOD FOR MOUNTING FILMS
Filed Dec. 11, 1967

INVENTOR.
HAROLD J. THOMPSON JR.
BY
Merchant & Gould
ATTORNEYS

United States Patent Office 3,536,555
Patented Oct. 27, 1970

3,536,555
APPARATUS AND METHOD FOR
MOUNTING FILMS
Harold J. Thompson, Jr., 513 3rd St. S.,
Minneapolis, Minn. 55401
Filed Dec. 11, 1967, Ser. No. 689,379
Int. Cl. B31f 5/00; B32b 31/04
U.S. Cl. 156—108                                  4 Claims

ABSTRACT OF THE DISCLOSURE

Apparatus including a flat surface having a pair of longitudinally spaced apart pegs extending outwardly therefrom, a first sheet of relatively stiff material having openings therein for viewing the frames of a film, and a pair of openings corresponding with the positions of the two pegs, an adhesive coating on one surface of the first sheet covered by a removable protective sheet of material and a second sheet of relatively stiff material having openings therein corresponding with all of the openings in the first sheet. A method of using the apparatus including removing the protective material from the first sheet and placing it over the pegs so that it lies flat on the surface, butting one edge of a film against the pegs and placing the film on the adhesive coating so that the frames are aligned with the openings in the first sheet of material, and placing the second sheet of material in overlying relationship on the first sheet of material with the film sandwiched therebetween. The adhesive coating holds the entire assembly fixedly in place.

BACKGROUND OF THE INVENTION

Field of the invention

In viewing film, especially where each frame is to be viewed separately, such as X-ray films and the like, it is common practice to mount the films in relatively stiff material so that they will not be bent during viewing and other handling, such as filing and the like.

Description of the prior art

In the prior art, several types of apparatus and method are utilized to mount the films for viewing. One such method is to separate the various frames of a film and mount each frame separately by gluing between two pieces of cardboard having a central opening therethrough, or placing each separately in a metal frame. A second type of apparatus and method is to provide two pieces of die-cut cardboard having openings therethrough corresponding with a plurality of frames of a film, manually aligning a strip of film with the openings in one of the pieces of cardboard and gluing the other piece of cardboard in overlying relationship thereon. All of these prior art methods are extremely slow, and the various frames are extremely difficult to align with the openings in the mounting apparatus.

SUMMARY OF THE INVENTION

In the present invention, a jig is provided which includes a flat surface having a plurality of spaced apart pegs extending outwardly therefrom. The invention further includes a first sheet of relatively stiff material having an adhesive coating on one surface thereof and a first plurality of openings therethrough corresponding with the number of said pegs and positioned so as to be approximately coaxially engaged over said pegs, said first sheet having in addition a second plurality of openings therethrough corresponding with the number of frames desired to be mounted and spaced apart longitudinally a distance such that each opening underlies a separate frame of the film with said second plurality of openings spaced transversely from said first plurality of openings so that a longitudinal edge of said film placed in abutting engagement with each of said pegs correctly positions the frames transversely over said second plurality of openings, and a second sheet of material having openings therethrough substantially similar in configuration and position to the openings in said first sheet and placed in overlying relationship to the adhesive-coated side of said first sheet with a film sandwiched therebetween.

It is an object of the present invention to provide new and improved apparatus for mounting films.

It is a further object of the present invention to provide a new and improved method of mounting films.

It is a further object of the present invention to provide apparatus and method for mounting films which is faster and more accurate than any of the prior art apparatus or methods.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
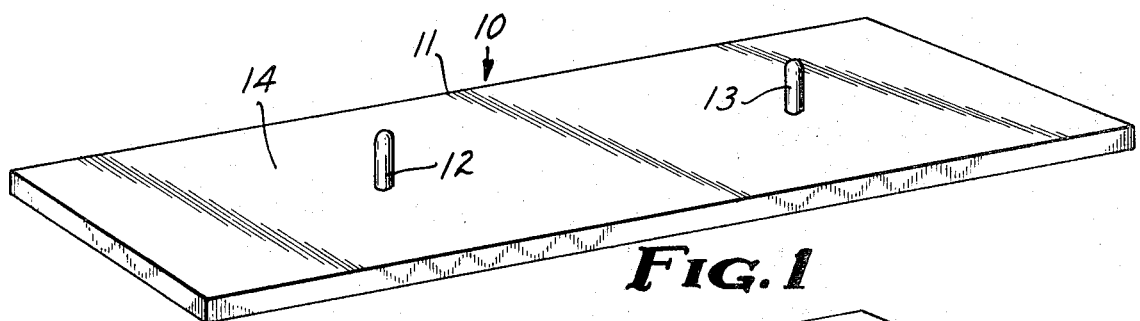
FIG. 1 is a view in perspective of the mounting jig.
Figure 2:
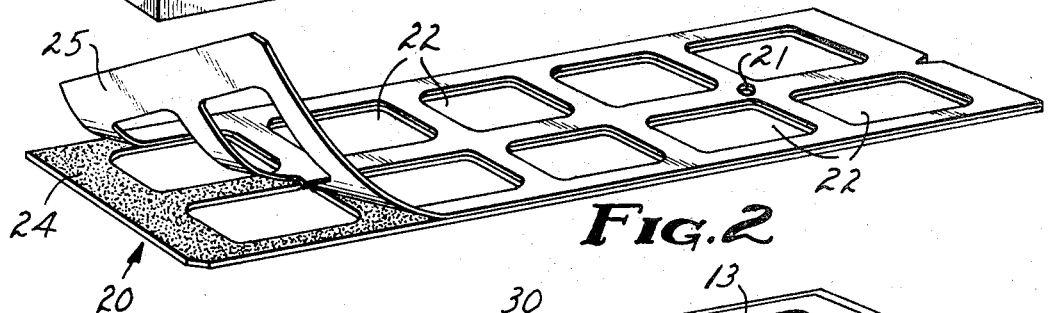
FIG. 2 is a view in perspective of a sheet of mounting material having an adhesive coating on the upper surface thereof and a protective sheet of material, partially removed, thereon.
Figure 3:
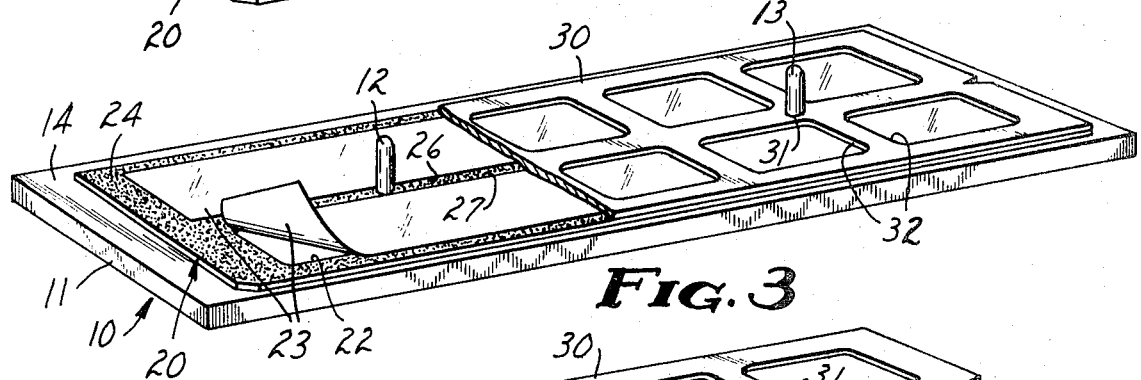
FIG. 3 is a view in perspective of the complete assembly mounted on the jig, parts thereof removed and shown in section.
Figure 4:
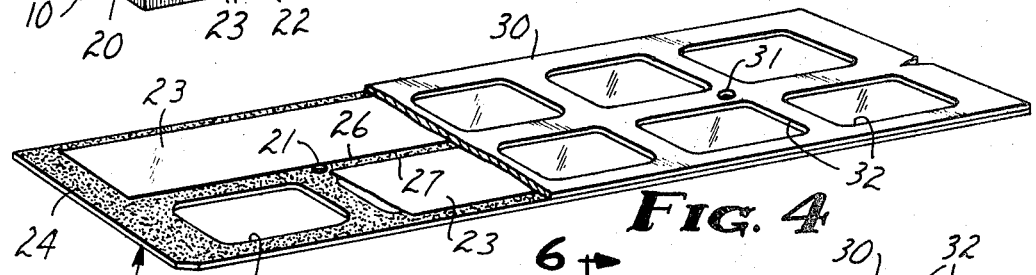
FIG. 4 is a view of the completed assembly similar to FIG. 3, but removed from the jig.
Figure 5:
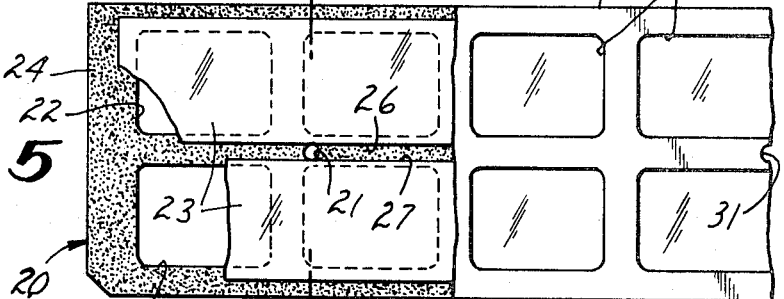
FIG. 5 is a view in top plan of a completed assembly, parts thereof removed.
Figure 6:
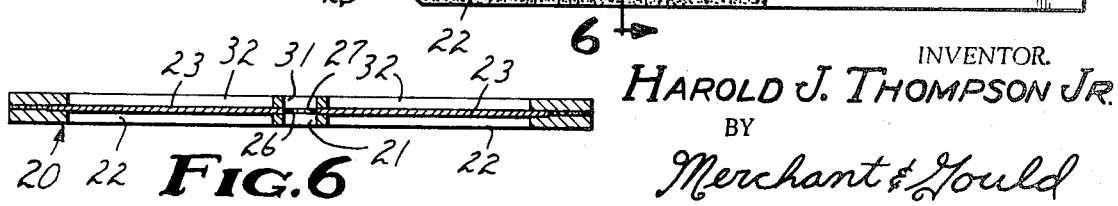
FIG. 6 is an enlarged sectional view as seen from the line 6—6 in FIG. 5.

In the figures, the numeral 10 generally designates a jig including a generally rectangularly-shaped plate 11 having a pair of cylindrical-shaped pegs 12 and 13 extending outwardly from an upper flat surface 14 thereof. It should be understood that the jig 10 might take on a variety of embodiments including more or different shaped pegs and the flat surface 14 might be formed as a portion of a counter, table, or the like. It is fully intended that all such variations and different embodiments of the jig 10 come within the scope of this invention.

A first sheet generally designated 20 of relatively stiff material has a first plurality of openings 21 therethrough corresponding with the number of pegs 12 and 13 in the jig 10 and positioned so that the holes 21 can be placed coaxially over the pegs 12 and 13. The first sheet 20 has a second plurality of openings 22 therethrough extending longitudinally the length of the first sheet 20 and spaced transversely on either side of the openings 21. Each opening 22 corresponds with a frame in a film 23 and the openings 22 are spaced apart longitudinally the same distance that the frames are spaced apart on the films 23 so that each frame on the film 23 can be aligned with an opening 22. A surface 24 of the first sheet 20 has an adhesive coating thereon, and a sheet 25 of protective material is placed in overlying relationship to the surface 24 so that the first sheet 20 may be stored conveniently. In the production of the first sheet 20, the surface 24 is coated with adhesive and the sheet 25 is placed in overlying relationship thereto, after which the holes 21 and 22 are formed therethrough. It should be understood that other

//_PAGE_END_// methods of forming the first sheet 20 might be developed by those skilled in the art, and all such variations and embodiments are included in the scope of this invention.

To place the film 23 in the present mounting assembly, the protective sheet 25 is removed from the surface 24 of the first sheet 20, and the first sheet 20 is placed on the flat surface 14 with the openings 21 approximately coaxially engaged over the pegs 12 and 13. With the first sheet 20 lying on the flat surface 14 and the surface 24 directed upwardly, two strips of film 23 are placed so that a longitudinal edge 26 and 27 of each is abutting both of the pegs 12 and 13, and the various frames in the strips of film 23 are longitudinally aligned with the openings 22. The two strips of film 23 are then placed in flat engagement with the portions of the surface 24 surrounding the openings 22, and the adhesive thereon holds the film strips 23 fixedly in place. A second sheet 30 of relatively flexible material similar to the material making up sheet 25 is formed with openings 31 therethrough similar to openings 21 through the first sheet 20, and openings 32 therethrough similar to openings 22 through the first sheet 20. The second sheet 30 is placed so that the openings 31 are engaged over and substantially coaxial with the pegs 12 and 13, and is pressed firmly against the portions of the surface 24 of the first sheet 20 which extend outwardly around the two film strips 23. The adhesive on the surface 24 holds the second sheet 30 fixedly in overlying relationship on the first sheet 20 with the two film strips 23 sandwiched therebetween. Once the second sheet 30 is pressed firmly into place, the entire assembly, including the first sheet 20, the two film strips 23, and the second sheet 30, can be removed from the jig 10.

The use of the jig 10 to hold the first sheet 20 fixedly in place and the particular position of the openings 22 relative to the openings 21 so that the pegs 12 and 13 can be utilized to correctly position the two film strips 23, greatly enhance the mounting of the film strips 23. Also, placing an adhesive coating on the surface 24 of the first sheet 20 and covering it with a protective sheet 25 greatly enhances the assembly of the mounting apparatus.

While I have shown and described a specific embodiment of this invention, further modifications and improvements will occur to those skilled in the art. I desire it to be understood, therefore, that this invention is not limited to the particular form shown, and I intend in the appended claims to cover all modifications which do not depart from the spirit and scope of this invention.

What is claimed is:
1. Apparatus for mounting strips of film having a plurality of longitudinally spaced apart frames thereon comprising:
   (a) a flat surface having at least two pegs affixed therein extending outwardly generally perpendicular thereto and spaced apart a predetermined distance;
   (b) a first sheet of material having an adhesive coating on the upper surface thereof and a first plurality of openings therethrough corresponding with the number of said pegs and positioned so as to be approximately coaxially engaged over said pegs with said first sheet lying substantially on said flat surface;
   (c) said first sheet having in addition a second plurality of openings therethrough corresponding with the number of frames on said film and spaced apart longitudinally a distance such that each opening underlies a separate frame of said film, said second plurality of openings being spaced transversely from said first plurality of openings so that an edge of said film is abutting each of said pegs when the frames of said film are correctly positioned transversely relative to said second plurality of openings; and
   (d) a second sheet of material, separate from said first sheet, having openings therethrough substantially similar in configuration and position to the openings in said first sheet and positionable in overlying relationship with said film and portions of said first sheet so as to be fixedly engaged thereto by said adhesive coating.

2. Apparatus for mounting films as set forth in claim 1 wherein a sheet of protective material is removably positioned in overlying relationship to said adhesive coating prior to the application of the film thereon.

3. A method of mounting films having a plurality of spaced apart frames thereon comprising the steps of:
   (a) providing a flat surface having at least two pegs affixed therein extending outwardly generally perpendicular thereto and spaced apart a predetermined distance;
   (b) providing a first sheet of material having an adhesive coating on one side thereof and first and second pluralities of openings therethrough, said first plurality of openings corresponding with the number of said pegs and spaced apart said predetermined distance, said second plurality of openings each corresponding approximately in size to a frame on said film and spaced apart approximately the distance said frames are spaced apart, and said second plurality of openings being spaced transversely from said first plurality of openings approximately the distance between a longitudinal edge of a film and an adjacent edge of a frame thereon;
   (c) placing said first sheet on said flat surface with said first plurality of openings generally coaxial with said pegs and said adhesive coating directed outwardly from said surface;
   (d) placing a strip of film on said adhesive coating with a longitudinal edge abutting said pegs and the frames aligned longitudinally with said second plurality of openings;
   (e) providing a second sheet of material having openings therethrough substantially similar in configuration and position to said first and second pluralities of openings in said first sheet; and
   (f) placing said second sheet in overlying relationship over said first sheet so as to sandwich said film therebetween and pressing the assembly firmly against said flat surface to fixedly engage said first and second sheets by said adhesive coating.

4. A method of mounting films as set forth in claim 3 wherein the step of providing a first sheet of material includes the steps of coating said one side of said first sheet of material with an adhesive, covering said adhesive with a sheet of removable protective material for storing said first sheet until use thereof, and forming said first and second pluralities of openings through at least said first sheet, and the additional step of removing said sheet of protective material is performed prior to the step of placing a strip of film on said adhesive coating.

References Cited
UNITED STATES PATENTS

| | | | |
|---|---|---|---|
| 2,302,561 | 11/1942 | Libby et al. | 156—514 |
| 2,596,253 | 5/1952 | Kurkjian | 156—539 |
| 2,704,566 | 3/1955 | Thompson et al. | 269—53 X |
| 2,794,489 | 6/1957 | Drummond | 156—505 |
| 3,082,866 | 3/1963 | Kessman | 156—505 X |
| 2,726,187 | 12/1955 | Ringer | 156—251 X |

CARL D. QUARFORTH, Primary Examiner

H. E. BEHREND, Assistant Examiner

U.S. Cl. X.R.

156—514, 539; 269—53